(12) United States Patent
Klee

(10) Patent No.: US 6,531,082 B1
(45) Date of Patent: Mar. 11, 2003

(54) METHOD FOR IMPREGNATING CONDUCTOR BARS FOR THE STATOR WINDING OF AN ELECTRICAL MACHINE

(75) Inventor: Peter Klee, Waldmichelbach (DE)

(73) Assignee: Alstom Power, Windsor, CT (US)

( * ) Notice: Subject to any disclaimer, the term of this patent is extended or adjusted under 35 U.S.C. 154(b) by 0 days.

(21) Appl. No.: 09/368,647

(22) Filed: Aug. 5, 1999

(30) Foreign Application Priority Data

Aug. 5, 1998 (DE) .......................... 198 35 361

(51) Int. Cl.$^7$ .................. H02K 15/12; H02K 15/14; H01B 13/32; B29C 70/70
(52) U.S. Cl. ............... 264/257; 264/258; 264/272.19; 264/272.21; 264/279.1; 29/602.1; 29/606
(58) Field of Search .................. 264/510, 511, 264/257, 258, 272.19, 272.21, 279.1, 324; 29/602.1, 605, 606

(56) References Cited

U.S. PATENT DOCUMENTS

| | | | | |
|---|---|---|---|---|
| 3,577,506 A | * | 5/1971 | Brown ................. | 264/217.19 |
| 3,631,590 A | * | 1/1972 | Wichmann .............. | 29/596 |
| 3,633,140 A | * | 1/1972 | Lake .................. | 336/182 |
| 3,766,416 A | * | 10/1973 | Papst et al. ........... | 310/43 |
| 4,370,188 A | * | 1/1983 | Otty ................. | 156/245 |
| 4,405,553 A | | 9/1983 | Lövgren et al. | |
| 4,540,536 A | * | 9/1985 | Altmann et al. ......... | 264/102 |
| 4,635,348 A | * | 1/1987 | Van Zyl ............... | 29/596 |
| 5,464,949 A | * | 11/1995 | Markovitz et al. ...... | 174/120 R |
| 5,759,589 A | * | 6/1998 | George, Jr. ........... | 425/129.1 |
| 5,760,516 A | * | 6/1998 | Baumann et al. ......... | 310/201 |
| 5,771,563 A | | 6/1998 | Meier et al. | |
| 6,043,582 A | * | 3/2000 | Markovitz et al. ........ | 310/213 |

FOREIGN PATENT DOCUMENTS

| | | | |
|---|---|---|---|
| JP | 35-95311 | * | 7/1980 |
| JP | 57-134916 | * | 8/1982 |
| JP | 07231622 | | 8/1995 |
| JP | 10-295063 | * | 11/1998 |

* cited by examiner

Primary Examiner—Stefan Staicovici
(74) Attorney, Agent, or Firm—Laurence A. Greenberg; Werner H. Stemer; Ralph E. Locher

(57) ABSTRACT

Conductor bars for the stator winding of an electrical machine are impregnated by winding the bars with an insulation, impregnating the insulation, and then curing. Specifically, the bars are provided on their surface with an insulation which is produced by wrapping each conductor bar with an insulating tape, preferably with a mica-containing insulating tape, which is impregnated with an insulating fluid, preferably curable synthetic resin. Each conductor bar provided with the finished insulation is provided over its entire length with a press-tight and fluid-tight casing. The encased conductor bar is subjected on all sides to a pressure $p_1$ in a pressing device. The impregnating fluid is introduced into the interspace between the insulated conductor bar and the casing at a pressure $P_2<P_1$. The conductor bar, loaded with impregnating resin over its entire length in this way and surrounded by the casing, is pressed to shape and size at the curing temperature.

10 Claims, 1 Drawing Sheet

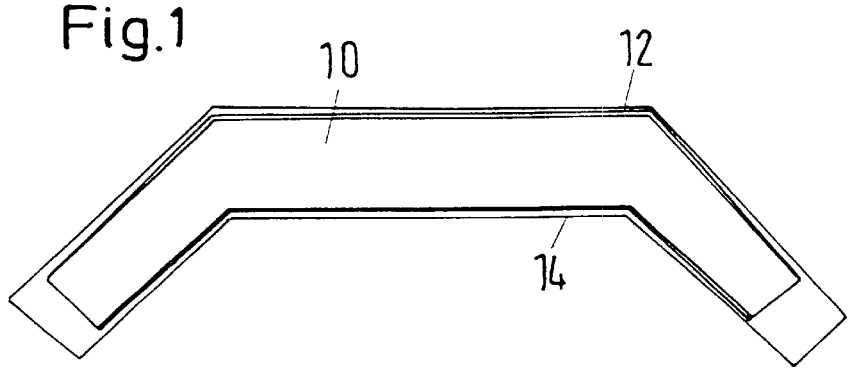
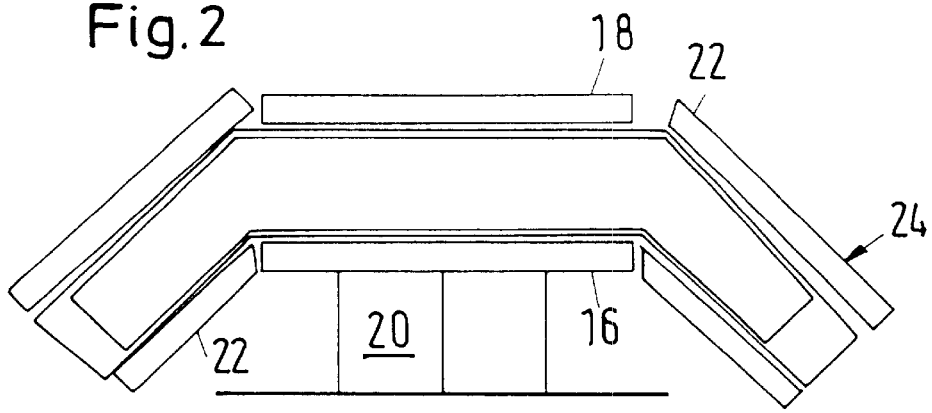
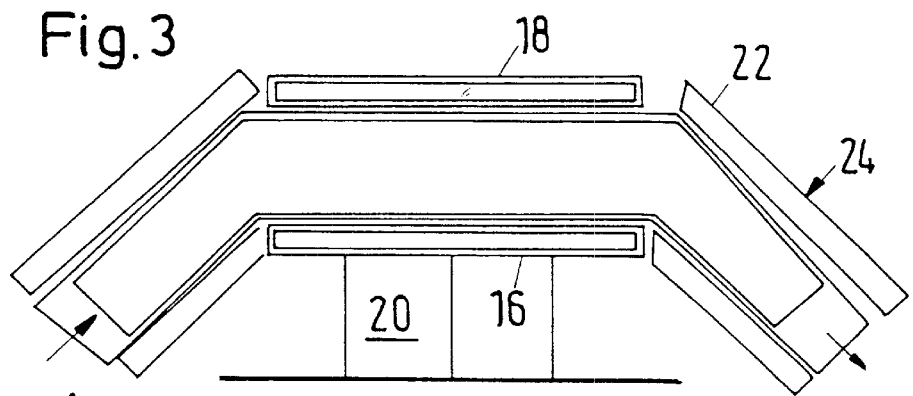
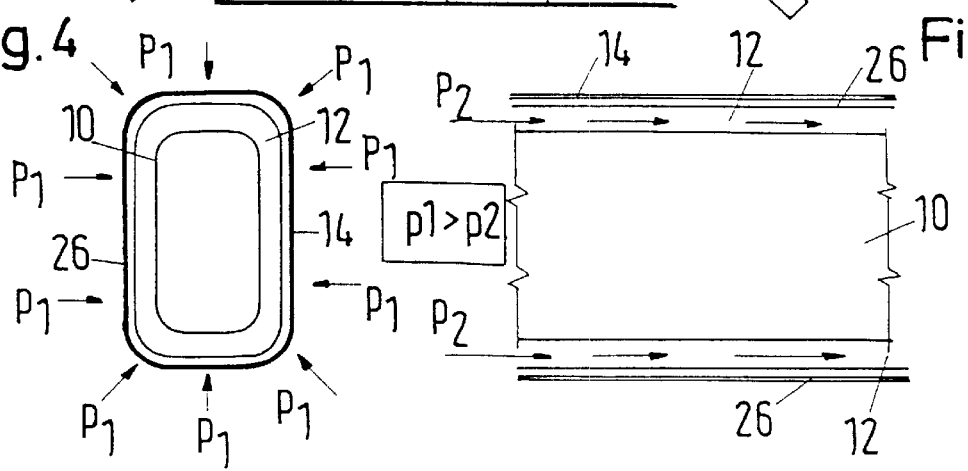

METHOD FOR IMPREGNATING CONDUCTOR BARS FOR THE STATOR WINDING OF AN ELECTRICAL MACHINE

BACKGROUND OF THE INVENTION

FIELD OF THE INVENTION

The invention relates to a method of impregnating conductor bars for the stator winding of an electrical machine. The conductor bars are each provided on their surface with an insulation which is produced by wrapping each conductor bar with an insulating tape, preferably with a glass-containing or mica-containing insulating tape, which is impregnated with an insulating agent as impregnating fluid, preferably consisting of curable synthetic resin, in an impregnating tank in conjunction with an autoclave. The conductor bars are pressed to shape and size in a press die before the impregnating fluid cures.

It is conventionally known to provide the conductor bars for the stator winding of electrical machines with insulation before they are inserted into the stator slots provided for this purpose.

The insulation of the conductor bars conventionally consists of a wrapping with mica-containing insulating tape or of a mica tape which is impregnated with an impregnating fluid. The impregnating fluid is preferably a curable synthetic resin. It serves, on the one hand, for fixing the insulating wrapping and, on the other hand, for improving the insulation by preventing the possible absorption of moisture.

The impregnating agent is conventionally applied in a so-called impregnating tank which is arranged in an autoclave. First, a vacuum is thereby set for a short time in the autoclave. The establishment of the vacuum removes possible gas accumulations between the wrapping and the conductor bar which could constitute an obstacle to the absorption of the impregnating fluid.

For impregnation, the impregnating tank is then filled with the impregnating fluid and the respective conductor bar is dipped in. The bar is thereby wetted with the impregnating fluid. An overpressure is subsequently set in the autoclave, ensuring that the impregnating fluid penetrates into the insulating wrapping. Once it is ensured that all the cavities in the insulating wrapping are filled with impregnating fluid, ambient pressure is once more set in the autoclave and any excess impregnating fluid is returned to the supply container.

Due to the fact that the quantity of impregnating fluid necessary for flooding a conductor bar in the impregnating tank is about 10 to 50 times the quantity actually required for impregnating the conductor bar, and due to the fact that the excess which is necessary in each case is, if possible, to be reused, for example for the proper use of resources and in order to reduce the problem of disposing of synthetic resins of this kind, impregnation is to be carried out under defined conditions, for example at an appropriately low temperature which does not impair, or only insignificantly impairs, the stability of the resin, since the renewed processibility of the excess impregnating fluid is otherwise no longer guaranteed.

The viscosity of the impregnating fluid is therefore set in such a way that, on the one hand, thorough impregnation of the wrapping is ensured and, on the other hand, impregnating fluid no longer escapes during curing. After impregnation, that is to say after the wrapping has been impregnated with impregnating fluid, the curing of the impregnating fluid takes place, preferably at increased temperature, in order to reduce the curing time.

In view of the accuracy of contour and the dimensional accuracy required in the ready-to-install conductor bars, they are subjected before or during impregnation to pressing. This ensures that the cross sections of the conductor bars do not lead to fitting problems when they are being installed in the stator. This pressing may be carried out in various ways, specifically locally or totally and both at ambient temperature and at increased temperature, for example in a kiln. Also, if appropriate, pressing may be carried out, before impregnation, as so-called dry pressing, in contrast to so-called wet pressing which is carried out after impregnation has taken place. Before wet pressing, the conductor bar is wrapped in a separating foil which prevent the press die from adhering to the conductor bar.

Another important reason for pressing the insulation is, furthermore, to achieve optimum electrical and mechanical properties which depend essentially on the ratio of the fractions of impregnating fluid to mica or glass.

It follows from the foregoing that the impregnation process described above is highly complicated in manufacturing terms and therefore decidedly time-intensive.

SUMMARY OF THE INVENTION

It is accordingly an object of the invention to provide a method and device for impregnating conductor bars for the stator winding of an electrical machine, which overcomes the above-mentioned disadvantages of the heretofore-known devices and methods of this general type and which assures that, while a smaller quantity of impregnating fluid is required, the time necessary for impregnating a conductor bar is reduced.

With the foregoing and other objects in view there is provided, in accordance with the invention, a method of impregnating a conductor bar for a stator winding of an electrical machine, which comprises:

providing a surface of a conductor bar with an insulation by wrapping the conductor bar with an insulating tape;

placing a pressure-tight and fluid-tight casing over an entire length of the conductor bar provided with the insulation to form an encased conductor bar;

subjecting the encased conductor bar on all sides to a pressure $p_1$ in a pressing device and introducing an impregnating fluid into an interspace between the insulated conductor bar and the casing at a pressure $p_2 < p_1$; and pressing the conductor bar, loaded with impregnating fluid over the entire length thereof and surrounded by the casing, to shape and size in a press die at a curing temperature of the impregnating fluid.

In accordance with an added feature of the invention, the process is performed in an autoclave, i.e., the encased conductor bar is introduced into an autoclave at least prior to the subjecting step.

In accordance with an additional feature of the invention, the tape is mica-containing insulating tape and the impregnating fluid is a curable synthetic resin.

According to the invention, therefore, each conductor bar having a finished insulating wrapping is provided over its entire length with a pressure-tight and fluid-tight casing. In this context, the encased conductor bar is subjected on all sides to a pressure $P_1$ in a pressing device, the impregnating fluid being introduced into the interspace between the insulated conductor bar and the casing at a pressure $p_2 < p_1$, and the conductor bar, loaded with impregnating resin over its entire length in this way and surrounded by the casing, being pressed to shape and size at the curing temperature.

In comparison with the prior art processes, the method according to the invention improves both the outlay in terms of apparatus and the outlay in terms of process engineering considerably. Instead of impregnation in a bulky impregnating tank, the loading with impregnating fluid which takes place under pressure is now provided only within a casing resting comparatively closely against the conductor bar. This casing also at the same time functions as a separating foil, in order to prevent adhesion to the clamping jaws of a pressing device. In this case, in a development of the invention, the hose-like casing serving as a foil for separation from the pressing device is removed after curing has taken place, that is to say depending on the material used for the casing, being destroyed at the same time or in such a way that it can be reused.

The loading of the conductor bar with clamping jaws of a pressing device serves for ensuring the necessary accuracy of contour and dimensional accuracy during the operation of curing the impregnating fluid, whilst the intended pressing of the conductor bar may be accompanied by thermal action.

Particularly the latter-mentioned aspect has great potential for simplifying the method, since, due to curing in the press mould at increased temperature, on the one hand the original manufacturing time of approximately 50 h is markedly reduced to about one fifth of the time and, simultaneously, the accuracy of contour and the dimensional accuracy are improved considerably, this having a beneficial effect on the time required for mounting the conductor bars in the stator, since there is virtually no need for additional work for the purpose of achieving a fit.

In accordance with another feature of the invention, the conductor bar has a linear middle region and angled ends, and wherein the method comprises loading the linear middle region on all sides in a fixed pressing device having flexurally resistant clamping jaws and loading the angled ends with press jaws of a movable pressing device.

In accordance with a further feature of the invention, the introducing step comprises feeding the impregnating fluid at a relatively low temperature (e.g. room temperature) into the casing surrounding the conductor bar, and maintaining a fluid pressure of the impregnating fluid during the curing of the impregnating fluid.

In accordance with again a further feature of the invention, the impregnating fluid is cured at an increased temperature, such as at T>90° C.

With the above and other objects in view there is provided, in accordance with the invention, a device for performing the above-outlined method, i.e., a device for impregnating a conductor bar for a stator winding of an electrical machine, comprising:

an impregnating device having a hose-like flexible casing for receiving and encasing a conductor bar over an entire length thereof, wherein the conductor bar (10 is formed with a rectilinear region and angled regions adjoining the rectilinear region and is provided with an insulation;

a device communicating with the casing for filling the casing with pressurized impregnating fluid;

a pressing device with a stationary pressing device having a plurality of clamping jaws surrounding on all sides at least the rectilinear region of the conductor bar, and movable sleeve-like pressing devices surrounding and pressing the angled regions of the conductor bar adjoining the rectilinear region.

In accordance with yet an added feature of the invention, the sleeve-like pressing devices are formed by pressure hoses adapted to be laid around the ends of the respective conductor bar.

In accordance with yet an additional feature of the invention, the casing is a pressure-tight and fluid-tight casing with a cross section slightly larger than a cross section of the conductor bar wrapped with insulation. In the preferred embodiment of the invention, the casing is a shrinkable hose.

In accordance with a concomitant feature of the invention, the casing serves as a foil for separating the conductor bar from the clamping jaws of the pressing device, whereby the casing is removed after the impregnating fluid has cured.

According to an advantageous development of the method according to the invention, the conductor bar is loaded on all sides, in its linear middle region, in a fixed pressing device having flexurally resistant press jaws and, at its bent or angled ends, in each case by means of press jaws of a movable pressing device. With the aid of this procedure, laborious fitting work for accurate loading may be dispensed with.

In view of the curing of the impregnating fluid, it proves advantageous if the curing of the impregnating fluid takes place at increased temperature, preferably at T>80° C.

In a further preferred embodiment of the method according to the invention, the impregnating fluid is fed at low temperature, for example room temperature, into the casing surrounding the conductor bar, and the fluid pressure of the impregnating fluid is maintained during the curing of the latter.

A device for impregnating a conductor bar for a stator winding of an electrical machine by the method employed hitherto has an impregnating means, which receives the impregnating fluid intended for impregnating the conductor bar provided with an insulating tape, and a fixed pressing device with clamping jaws, into which the conductor bar can be at least partially inserted and in which it can be subjected to load.

The method according to the invention cannot be carried out directly by means of this device used hitherto, since, in this case, the impregnation of the insulation of the conductor bar takes place, for example, separately from the pressing which is subsequently carried out.

A further object of the invention is, therefore, to provide a device, by means of which the method according to the invention can be carried out and which, at the same time, has a correspondingly simple design, so that it is likewise simple to handle.

To achieve this object therefore, there is provision, according to the invention, for the impregnating means to be formed by a hose-like flexible casing which surrounds the conductor bar over the entire length of the latter, for providing a device for filling the hose-like casing with impregnating fluid which is put under pressure, for the clamping jaws of the fixed pressing device to surround on all sides at least the rectilinear region of the conductor bar, and for providing, in order to press the bent or angled regions of the conductor bar which adjoin its rectilinear region, in each case movable sleeve-like pressing devices which surround the conductor bar on all sides.

For simple handling, the sleeve-like pressing devices are formed by pressure hoses which are laid in each case around the ends of the respective conductor bar. These pressure hoses are to some extent flexible, so that they can be adapted to the dimensions of the conductor bars and, on the other hand, also fully load the conductor bar end regions deviating from the rectilinear.

In a further refinement of the invention, the hose-like casing is designed to be pressure-tight and fluid-tight and has a cross section which is slightly larger than the cross section of the conductor bar provided with the insulation, that is to say wrapped with the insulating tape. In this case, in a preferred development of the invention, the hose-like casing may be designed as a shrinkable hose.

Another advantageous feature of the device according to the invention is that the hose-like casing serves as a foil for separation from the pressing device and can be removed after curing has taken place. In this case, depending on the material used, there may be provision for the casing to be destroyed during removal. This makes it possible to free the conductor bar quickly. There may, however, also be provision for the casing to consist of a material not wettable by the impregnating agent or to be provided with a special coating, for example consisting of PTFE, so that, after non-destructive removal, it is possible for the casing to be reused.

Other features which are considered as characteristic for the invention are set forth in the appended claims.

Although the invention is illustrated and described herein as embodied in a method and device for the impregnation of conductor bars for the stator winding of an electrical machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic longitudinal section through a conductor bar disposed in a casing for impregnation, in a first manufacturing step;

FIG. 2 is a diagrammatic longitudinal section through a conductor bar disposed in a casing for impregnation, in a second manufacturing step;

FIG. 3 is a diagrammatic longitudinal section through a conductor bar disposed in a casing for impregnation, in a third manufacturing step;

FIG. 4 is a cross-sectional view taken through the conductor bar of FIG. 3 disposed in a casing for impregnation; and FIG. 5 is a partial longitudinal section through the conductor bar of FIG. 4 disposed in a casing for impregnation.

DESCRIPTION OF THE PREFERRED EMBODIMENTS

Referring now to the figures of the drawing in detail and first, particularly, to FIG. 1 thereof, there is seen a conductor bar 10 which is provided with an insulation 12 formed from wrapped insulating tape. It will be understood by those skilled in the art that the dimensional relationships shown are not true to scale and cannot be transferred directly.

The conductor bar 10 provided with the insulation 12 is covered with a casing 14 which surrounds the conductor bar 10 with a narrow clearance. The casing 14 consists of a flexible pressure-tight and fluid-tight material. The flexibility relates to the fact that the casing 14 is capable of following axial changes in direction in the longitudinal extent of the conductor bar 10, that is to say, in particular, at the angled end regions of the conductor bar 10, the end regions pointing towards the so-called winding overhang.

The assembly illustrated diagrammatically in FIG. 2 shows the conductor bar 10 of FIG. 1 with the insulation 12 and surrounded by the casing 14 which projects at the ends of the conductor bar 10.

Also illustrated are clamping jaws 16, 18 of a fixed hot press 20 and clamping elements 22 of a removable pressing device. The hot press and pressing device loads, i.e, bears against, the conductor bar 10 on all sides. The illustration in longitudinal section does not illustrate the clamping jaws and clamping elements which in each case run parallel to the drawing plane.

The function of the clamping device 24 (formed by the hot press 20 and the clamping elements 22), at this stage of the process, is to ensure the accuracy of contour and dimensional accuracy of the conductor bar 10 provided with the insulation 12.

Referring now to FIG. 3, there is illustrated a third stage of the method. An impregnating fluid is fed, at one of the two ends, into a gap-like interspace 26 formed between the conductor bar 10 provided with the insulation 12 and the casing 14. The impregnating fluid flows around the conductor bar 10 over the entire length of the bar 10. When the impregnating fluid has reached the opposite end of the conductor bar 10, the latter (on the right-hand side in FIG. 3) is closed in a pressure-tight and fluid-tight manner.

Then, at an increased pressure $p_2$ which is lower than the pressure $p_1$ exerted by the clamping device 24, the interspace 26 between the conductor bar 10 and the casing 14 serving as an impregnating tank is loaded with the impregnating fluid. At the same time, the clamping device, which is under the pressure $p_1$, loads the outer contour of the conductor bar 10 or of the casing 14 resting closely against the latter.

During the loading action, the heating of the heating press 20 is switched on. As a result, the impregnating fluid— preferably provided as a curing synthetic—is cured simultaneously with the pressure loading.

In order to illustrate this method sequence, FIG. 4 reproduces a cross section and FIG. 5 a partial longitudinal section through the configuration shown in FIG. 3. The clamping jaws 16, 18 are symbolically illustrated here by means of the radial arrows symbolizing the pressure acting on all sides.

At the same time, the impregnating fluid fed in at one end on the end face flows through the entire length of the casing 14 receiving the conductor bar 10 and at the same time attempts to spread out. The casing 14 constitutes an insurmountable obstacle to the outside, so that the only remaining possibility is the insulation 12 wrapped around the conductor bar 10. Impregnating fluid, following the pressure gradient, penetrates here and thoroughly impregnates the insulating tape consisting preferably of mica and forming the insulation 12.

As a result of the accompanying pressure, which, according to the method, may take place at a higher pressure than has been possible hitherto, a more favorable ratio of the mica content determining the insulation quality to the fraction of impregnating fluid is achieved. Improved insulation is therefore the result of this measure, quite apart from substantially simplified handling which entails decisive advantages in terms of time and consequently, not least, also in cost terms.

In conjunction with the pressing device 24, the in-feed of impregnating fluid takes place virtually hydrostatically. This ensures a uniform penetration of the insulation by the impregnating fluid, while, on account of the small volume of the gap space 26, the quantity of impregnating fluid provided for fixing the insulation is already sufficiently limited, so that the desired excess of solid insulating material, preferably mica, in relation to the quantity of liquid insulating agent introduced is maintained.

I claim:

1. A method of impregnating a conductor bar for a stator winding of an electrical machine, which comprises:

providing a surface of a conductor bar with an insulation by wrapping the conductor bar with an insulating tape;

placing a pressure-tight and fluid-tight casing over an entire length of the conductor bar provided with the insulation to form an encased conductor bar;

subjecting the encased conductor bar on all sides to a pressure $p_1$ in a pressing device and introducing an impregnating fluid into an interspace between the insulated conductor bar and the casing at a pressure $p_2 < p_1$; and pressing the conductor bar, loaded with impregnating fluid over the entire length thereof and surrounded by the casing, to shape and size in a pressing device at a curing temperature of the impregnating fluid.

2. The method according to claim 1, which comprises introducing the encased conductor bar into an autoclave prior to the subjecting step.

3. The method according to claim 1, wherein the wrapping step comprises wrapping with a mica-containing insulating tape.

4. The method according to claim 1, wherein the impregnating fluid is a curable synthetic resin.

5. The method according to claim 1, wherein the conductor bar has a linear middle region and angled ends, and wherein the method comprises loading the linear middle region on all sides in a fixed pressing device having flexurally resistant clamping jaws and loading the angled ends with press jaws of a movable pressing device.

6. The method according to claim 1, wherein the introducing step comprises feeding the impregnating fluid at a relatively low temperature into the casing surrounding the conductor bar, and maintaining a fluid pressure of the impregnating fluid during the curing of the impregnating fluid.

7. The method according to claim 6, wherein the relatively low temperature is room temperature.

8. The method according to claim 6, which comprises curing the impregnating fluid at an increased temperature.

9. The method according to claim 8, wherein the increased temperature is $T > 90°$ C.

10. The method according to claim 1, wherein the casing is a hose-shaped casing serving as a foil for separation from clamping jaws (16,18,22) of the pressing device, and the method further comprises removing the casing after curing.

* * * * *